June 2. 1836 [illegible] 15

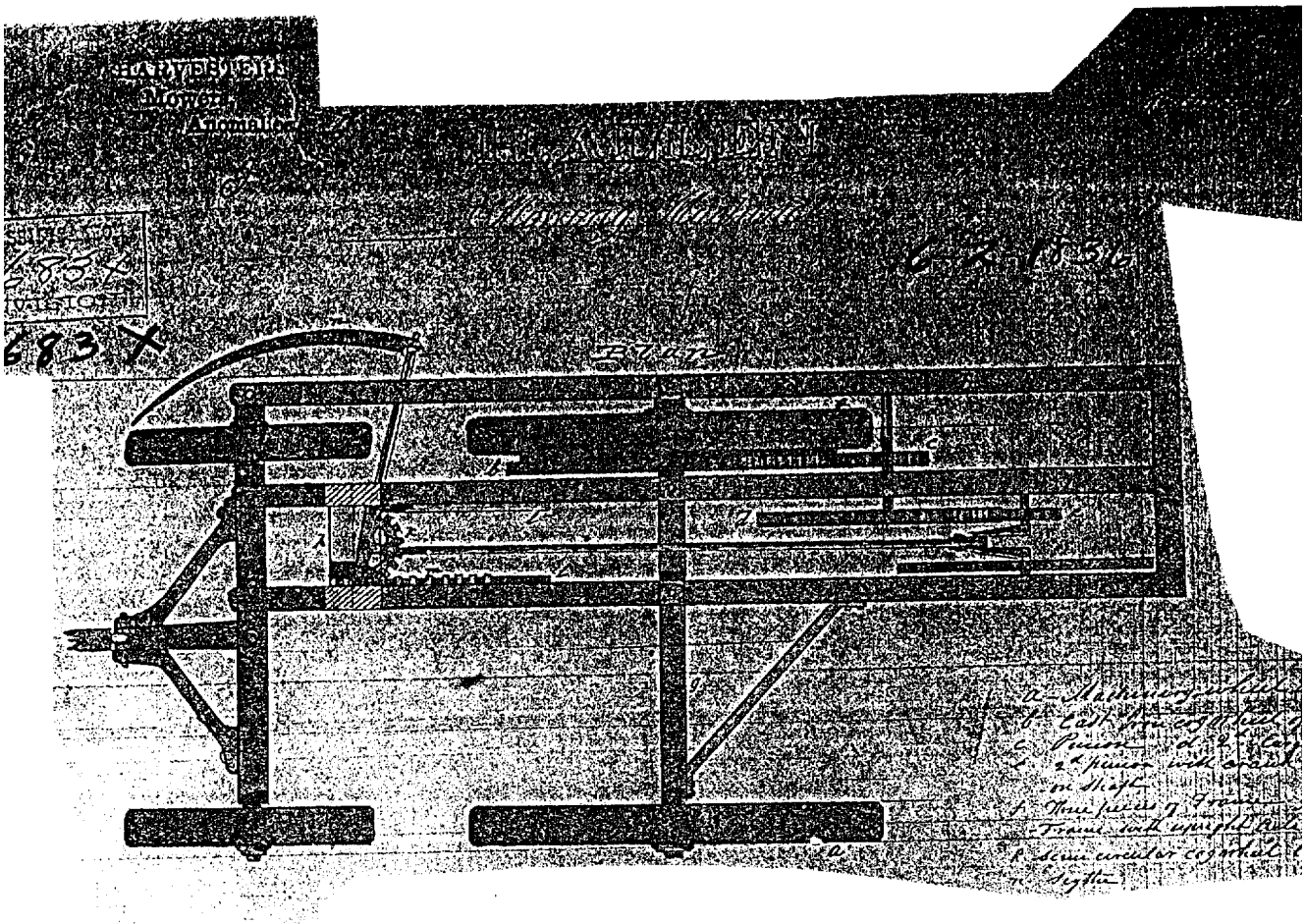
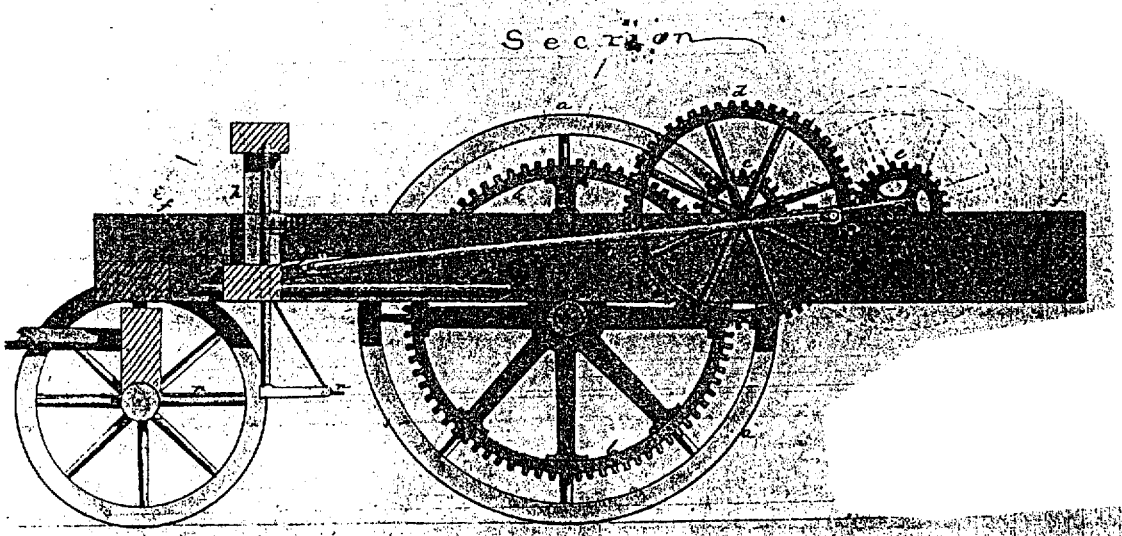
Section

Henry Allen in the county of Lincoln, state of Tennessee (392) 9683X

Letters Patent

The schedule referred to in these Letters Patent, and making part of the same, containing a description in the words of the said Henry Allen himself, of his improvement in the mowing machine To all to whom these Presents shall come Be it known; that I, Henry Allen in the county of Lincoln and state of Tennessee have invented a new and useful mowing Machine, and that the following is a full and exact description thereof— I have two wheels five feet in diameter revolving on an axle from six to eight feet long, the first or machinery wheel, has a cast iron cog wheel, four feet in diameter attached to it which works a pinion of fourteen inches in diameter on an iron shaft, to which is attached another cog-wheel of cast iron, three feet in diameter. This wheel turns another pinion on an iron shaft with a crank at one end of twelve or fourteen inches in length, to this shaft is attached a cast iron fly wheel. Three feet in diameter, and sufficiently heavy to overcome the dead points of the crank. This machinery determines the length of the frame from the shaft back, which is made of three strong seasoned scantling four by ten inches and confined to the axle by screw bolts in the following manner. The first runs on the outside of the machinery wheel, having a clamp which rests on the point of the axle, the second so near the inside of the wheel which is six inches in the tread, as to admit the machinery in as compact form, the third or last piece is twelve inches in the clear from the second piece, between these pieces, and immediately before the axle there is an upright axle passing thro' a sliding frame boxed and keyed so as to work with ease. This sliding frame moves through a space equal to double the length of the crank by a pitman connected with the crank and frame in thin iron slides screwed fast to the frame timbers, similar to the [illegible] of an engine

[illegible]

An upright frame connected to the sliding frame confines the top of this
axle by a small gudgeon; between the sliding and upright frame there
is a semi circular cog wheel of cast iron, the circumference of which,
corresponds with the length of the slide and works in a rack, thereby
turning the upright shaft in its motion backwards and forwards
giving the scythe nearly the same motion, as when used by the hands
of a man – An arm at the lower end of this axle which is made to
rise or fall at pleasure receives the sneath of the scythe similar to the
grasp of a man, the sneath is braced to the shaft by small iron rods
and screw taps, a sweep of the scythe determines the length of the
frame timbers in front of the axle which is tenoned into a bolster
resting on the axle of the fore wheels and raised so high as to make
the frame perfectly level, these wheels are to pass under the frame
in turning the machine – The length of the axle corresponds with the
width of the frame – Hounds and tongue similar to those of a wagon
are attached to the axle, and horses or oxen are worked in the usual
way – In the hub of the mashing wheel is a hole for the admission
of oil, the under part of the axle is made of iron and is supported by
a brace extending from the right to the frame – a seat may be fixed
in the space for the driver with a grindstone and apparatus for
sharpening scythe blades, in mowing with this machine the driver
should commence on the outer edge of the field and drive round gra-
dually approaching the centre leaving a full clearance for the machine
after the first round – By altering the frame of this machine so as
to work the horses inside of the frame, small grain or hemp may be
cut with it, the gearing of this machine must in every instance be
regulated by the movement of the ground wheels for instance if
it be desired that the blades shall cut twelve inches at the extreme
the crank should make one revolution, while the ground wheels
move through that space and so on by any number of inches to
be cut.

What I claim as my invention and which I desire
to secure by Letters Patent is the before described machine for

9683X

15.

mowing hay and cutting grain –

Witnesses

Wm. P. Elliott

Wm. Watson

H. Allen

Drawing Made

Ex.d

[Exhibit B]